No. 638,372. Patented Dec. 5, 1899.
M. B. ZERENER.
PRECIPITATION OF PRECIOUS METALS FROM THEIR CYANID SOLUTIONS.
(Application filed Sept. 20, 1897.)
(No Model.)
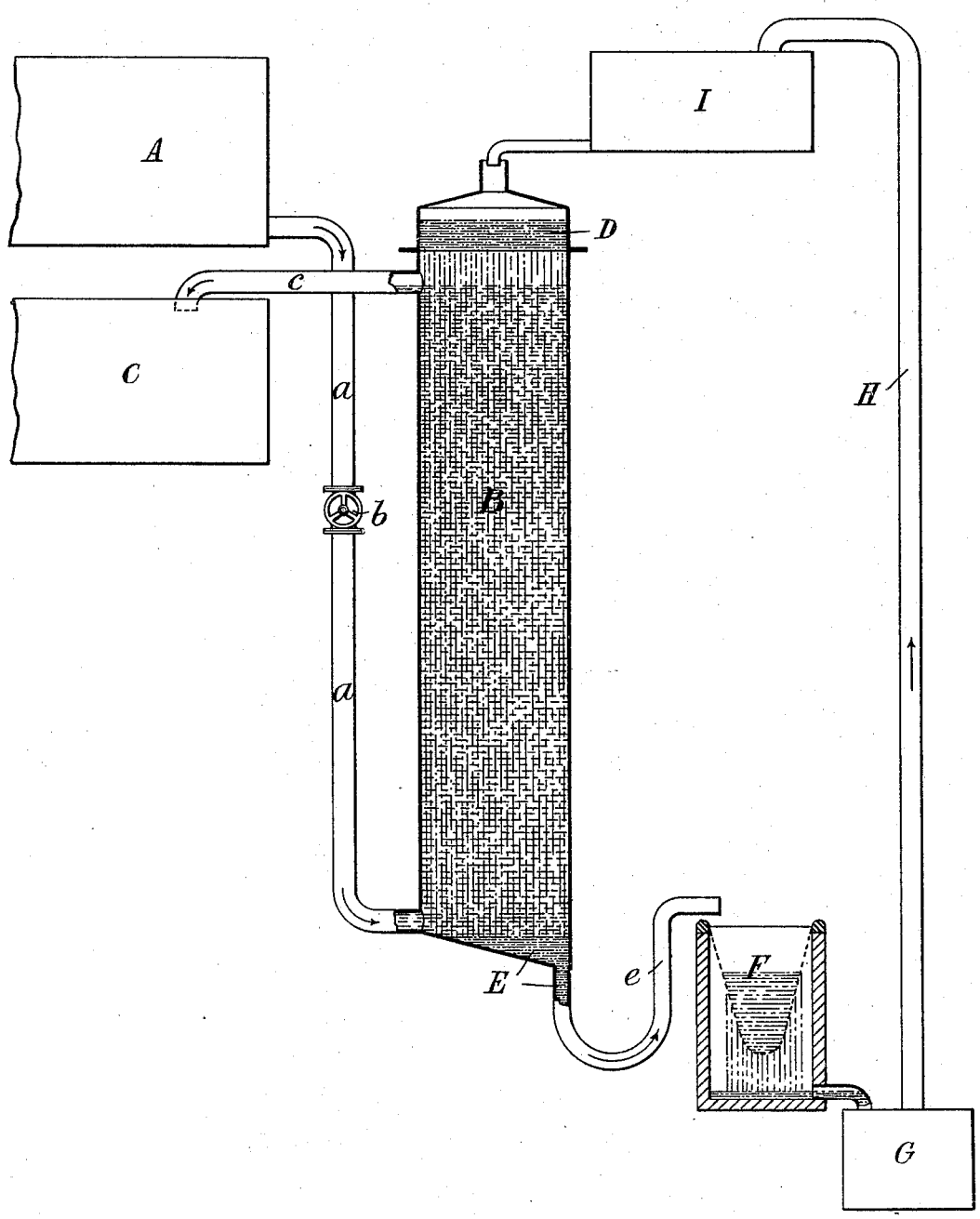

UNITED STATES PATENT OFFICE.

MARTIN BERNHARD ZERENER, OF LONDON, ENGLAND, ASSIGNOR TO THE GOLD EXTRACTION SYNDICATE, LIMITED, OF SAME PLACE.

PRECIPITATION OF PRECIOUS METALS FROM THEIR CYANID SOLUTIONS.

SPECIFICATION forming part of Letters Patent No. 638,372, dated December 5, 1899.

Application filed September 20, 1897. Serial No. 652,406. (No specimens.)

*To all whom it may concern:*

Be it known that I, MARTIN BERNHARD ZERENER, a subject of the Emperor of Germany, residing at London, England, have invented certain new and useful Improvements in or Relating to the Precipitation of Precious Metals from their Cyanid Solutions, (for which I have obtained Letters Patent in Great Britain, No. 12,255, dated June 4, 1896, and in South African Republic, No. 1,161, dated July 6, 1896,) of which the following is a specification.

This invention consists in a new method of precipitating gold and silver from solutions containing those metals chemically combined with cyanogen, commonly called "cyanid" solutions.

The precipitating agent I prefer to employ is the amalgam of one or several of the alkalies or alkali-earth metals, which is brought into contact with the gold-bearing solution in a novel manner, and it is necessary that the said amalgam should contain only so small a percentage of the alkali metal as to be liquid, like mercury.

As is well known, the alkali metals and their amalgams have a very strong affinity for cyanogen, and therefore are able to replace and liberate other metals, such as gold and silver, from their combinations with cyanogen; but, on the other hand, these alkali metals when coming into contact with water or chemical solutions instantly react with the constituents of the water, oxidizing themselves and liberating hydrogen gas. These two reactions may be represented by the following equations:

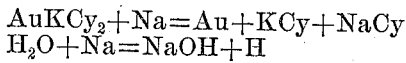

$$AuKCy_2 + Na = Au + KCy + NaCy$$
$$H_2O + Na = NaOH + H$$

Gold-bearing cyanid solutions derived from extracting ores or tailings contain only very small percentages of gold, the proportion of gold to water being frequently as one to one hundred thousand or less. If the amalgam of an alkali metal be brought in contact with such a dilute solution in the ordinary way—that is, by simply immersing it—evidently the second of the above reactions will prevail, while only a small part of the alkali metal could serve to precipitate gold, and the quantity of alkali metal required to precipitate a given quantity of gold would be very large and render such a method too expensive for practical purposes. I have, however, found that it is possible, even with small quantities of an alkali metal, to obtain complete precipitation of the precious metals if the following conditions are observed:

First. The alkali metal, preferably sodium, must be dissolved in a large excess of mercury. In practical working I usually employ mercury containing about five parts of sodium in ten thousand parts of mercury; but if all other arrangements are made accordingly, good results are obtained if the percentage of sodium is considerably below this limit. The advantage derived from this is that the sodium dispersed throughout a large quantity of mercury is not so quickly and violently oxidized by the water, and consequently has more opportunity to react with the gold compound and to reduce the gold.

Second. The alkali amalgam must be employed in a state of fine division, so as to present a large surface to the gold-bearing solution. It is well known that other metals when employed for the precipitation of gold from solutions act most satisfactorily if used in a state of very fine division. In the case of mercury, the ordinary means of subdividing metals not being available, I find it the best plan to employ the sodium-bearing mercury in the form of a great number of fine streams or drops or films or as a shower of spray or in such form that the exposed surface of the mercury is very large in proportion to its bulk. It is obvious that a certain quantity of amalgam subdivided into a great number of the finest drops and presenting a surface many thousand times larger than the same quantity of amalgam spread out in a thin layer must necessarily give increased opportunities to the alkali metal to come in contact with and reduce the gold.

Third. To increase still more the contact between the amalgam and the solution, it is important that the former should rapidly pass through the latter, thereby coming continually into contact with fresh portions of the solution. The quicker the amalgam changes its place the more completely will it be used for the desired purpose, while the useless decomposition of water will be reduced in proportion.

Fourth. The gold taken up by the mercury should be removed as far as possible continuously, so as to prevent any overcharging of the mercury.

To practically carry out these conditions, I arrange the precipitating process on the following general principles: The gold-bearing solution is contained in a vessel of convenient size and form. The liquid amalgam, kept in another vessel, is caused, by means hereinafter described, to pass into and through the cyanid solution in a multitude of fine streams or a quick succession of fine drops or in a number of fine films, and the cyanid solution is caused to flow through the precipitating vessel in the opposite direction to that followed by the liquid amalgam. After thus quickly passing through the vessel the mercury is separated from the solution, transported back to the starting-point, freed from the gold or part of the gold or not, as may be desired, charged again with alkali metal, and reused in the same manner. This circulation of the amalgam or mercury is continuous and uninterrupted as long as desired.

To still more clearly explain the nature of this invention, I give the following illustration as one way of carrying out the process:

The gold-bearing solution contained in the reservoir A passes through the pipe $a$, controlled by cock $b$, into the precipitating vessel B, slowly passing through it in an upward direction, escaping through pipe $c$ into a reservoir C. The precipitation of the precious metals is effected in B in the following manner: Above B is another vessel D, preferably of the same diameter and cross-section as B, containing the mercury charged with alkali metal. The bottom of this vessel is provided with fine openings, such as holes or slots, through which the amalgam passes in fine streams or drops into the precipitating vessel and through the gold solution. The fine globules of mercury collecting in the lower part E, which now contain gold, quickly unite again to one body of mercury, which is separated from the solution and delivered, preferably through a pipe $e$, which acts as a seal, into the strainer F and in the reservoir G. Thence the mercury is lifted by means of a pump or an elevator H into another vessel I, where it is charged again with alkali metal and used for further precipitating purposes. Thus the process is continued without interruption as long as there is cyanid solution to treat, and the gold amalgam remaining in the strainer F may be taken out at frequent intervals without interfering with the circulation.

It is obvious that the straining-filter (represented by F) may be put in any convenient position or that it may be replaced by another arrangement for separating out the precious metals. As the mercury is continually in circulation, the straining need not necessarily be perfect. In practical working the mercury will always retain a small percentage of gold; but after being saturated to a certain degree, depending upon the nature of the process by which the gold is separated from the mercury, it will deposit continually the whole of the precipitated gold and silver.

The charging of the mercury with alkali metal may be effected in different ways, either mechanically or electrolytically. Various ways may also be adopted to divide the amalgam into fine particles; but in all cases the division is effected by forcing the amalgam through a number of fine apertures either by its own gravity or by external pressure. I find it a most practical way to employ a vessel, such as D, with a perforated bottom, the number, size, and shape of the perforations to be chosen according to requirements. Good results are obtained with round holes of the smallest diameter that can be punched in metal plates; but oblong or square holes or long slots might be used with equally good effect. Instead of a perforated metal plate a bottom of other material may be used, and if it is not possible to make fine and smooth perforations in such material fine pipes of metal or glass or other material might be fixed into it, or a material may be used the nature of which obviates artificial perforations— such as any woven fabric, as canvas or linen, or some naturally porous material like wood— through which mercury can be passed under pressure. I can also provide simple means for varying the speed of the falling mercury by altering the head of mercury in D. If, for instance, the speed of the pump or elevator H is increased and an increased quantity of mercury passes into D per unit of time, the level of the mercury will rise. If, on the other hand, the total quantity of mercury in circulation is increased, the level of the mercury in D also rises and the speed of the issuing streams or drops increases. Although this is the best means of regulating the circulation of the mercury, it might also be effected by applying external pressure regulated according to requirements.

It is obvious that the size and form of the various vessels can be varied to a great extent.

Having now particularly described and ascertained the nature of my said invention and in what manner the same is to be performed, I wish to state that I am aware that the amalgams of the alkali metals have been previously used for the purpose set forth herein and that I do not claim their exclusive use, nor do I claim any method of continuously preparing these amalgams; but

What I claim is—

The process herein described of precipitating gold and silver from cyanid solutions, consisting in causing the solution to move in one direction and during such movement passing through it, in the opposite direction and in the form of a spray or a number of fine streams or films, mercury charged with alkali metal.

In testimony whereof I have hereto set my hand in the presence of the two subscribing witnesses.

MARTIN BERNHARD ZERENER.

Witnesses:
HARRY B. BRIDGES,
HAROLD H. SIMMONS.